C. CALLAHAN.
Attaching Handles to Hose.
No. 209,859. Patented Nov. 12, 1878.
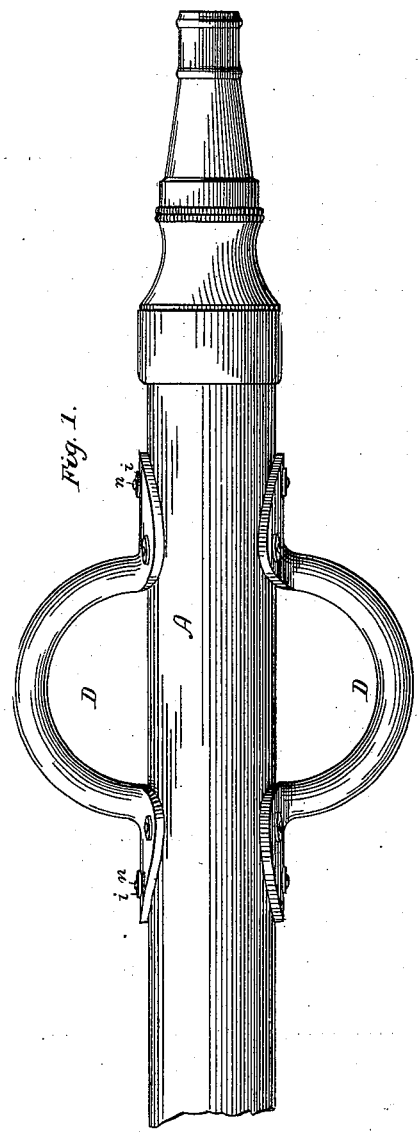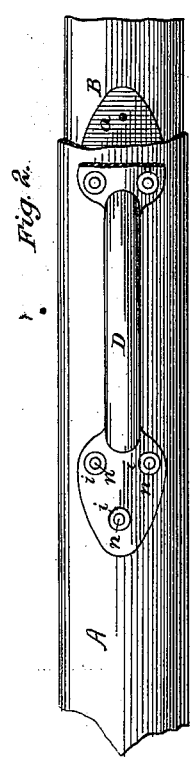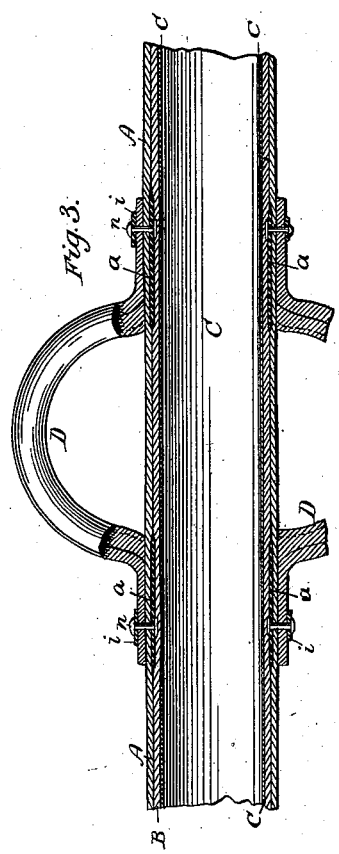

UNITED STATES PATENT OFFICE.

CORNELIUS CALLAHAN, OF CHELSEA, MASSACHUSETTS, ASSIGNOR OF TWO-THIRDS HIS RIGHT TO EDWIN E. SIBLEY, OF SAME PLACE.

IMPROVEMENT IN ATTACHING HANDLES TO HOSE.

Specification forming part of Letters Patent No. 209,859, dated November 12, 1878; application filed October 31, 1878.

*To all whom it may concern:*

Be it known that I, CORNELIUS CALLAHAN, of Chelsea, in the county of Suffolk, in the State of Massachusetts, have invented certain Improvements in Attaching Handles to Hose; and I hereby declare the following to be a full, clear, and exact description thereof, reference being had to the accompanying drawings, making part of this specification, in which—

Figure 1 is a side view of a piece of hose with my invention shown. Fig. 2 is a plan view of a piece of hose with the outer covering cut away to show the fastening. Fig. 3 is a longitudinal sectional view of the same.

Heretofore in applying handles to hose, when such handles have been fastened by rivets, the rivets have been entered from the inside of the hose, and passing entirely through the body of the hose. This mode of fastening is open to the serious objections, first, that the lugging on the hose to move it, and the consequent strain, ruptures the rubber lining; secondly, the sulphur in the rubber attacks and corrodes the rivets.

The object of my invention is to overcome these difficulties; and it consists in a duplex textile-fabric hose, rubber-lined, provided with handles secured by rivets and a plate to the outer tube, and not penetrating the inner tube or rubber lining in any way.

In order that those skilled in the art may make and use my invention, I will proceed to describe the manner in which I have carried it out.

In the said drawings, Fig. 1 shows a hose composed of an outer textile tube, A, an inner textile tube, B, and a rubber lining, C. A handle, of leather or other desirable material, D, is secured to the outer tube, A, (see Fig. 3,) by inserting between tubes A and B a plate, $a$, through which the rivets are inserted, and thence pass outward through tube A. Through the ends of the handle D washers are applied, as seen at $i\ i$, and the ends $n\ n$ of the rivets upset, so as to secure the handle firmly to the outer tube.

Having thus described my invention, what I claim as new, and desire to secure by Letters Patent, is—

The plate $a$, inserted between the outer and inner textile fabrics, A B, in combination with the handle D and rivets $n$, whereby the piercing of the water-proof coating C is avoided, substantially as set forth.

CORNELIUS CALLAHAN.

Witnesses:
  A. B. FULLER,
  GEORGE WILLCOMB.